(12) United States Patent
Lopez

(10) Patent No.: US 10,408,496 B2
(45) Date of Patent: Sep. 10, 2019

(54) SYSTEM, DEVICE AND ASSOCIATED METHODS FOR TEMPERATURE AND PRESSURE RELIEF IN A WATER HEATER

(71) Applicant: Juan A Lopez, Fayetteville, GA (US)

(72) Inventor: Juan A Lopez, Fayetteville, GA (US)

(73) Assignee: Juan A. Lopez, Fayetteville, GA (US)

( * ) Notice: Subject to any disclaimer, the term of this patent is extended or adjusted under 35 U.S.C. 154(b) by 0 days.

(21) Appl. No.: 15/949,786

(22) Filed: Apr. 10, 2018

(65) Prior Publication Data

US 2018/0252436 A1    Sep. 6, 2018

Related U.S. Application Data

(63) Continuation-in-part of application No. 15/220,559, filed on Jul. 27, 2016, now Pat. No. 9,939,174.

(60) Provisional application No. 62/244,900, filed on Oct. 22, 2015.

(51) Int. Cl.
*F24H 9/20* (2006.01)
*B23P 19/04* (2006.01)

(52) U.S. Cl.
CPC ............ *F24H 9/2007* (2013.01); *B23P 19/04* (2013.01)

(58) Field of Classification Search
CPC .................................................... F24H 9/2007
See application file for complete search history.

(56) References Cited

U.S. PATENT DOCUMENTS

| | | |
|---|---|---|
| 1,694,492 A | 12/1928 | Tabler |
| 1,941,023 A | 12/1933 | Smith |
| 2,210,555 A | 8/1940 | Podolsky |
| 2,570,432 A | 10/1951 | Dillon |
| 2,810,527 A | 10/1957 | Work |
| 3,366,128 A | 1/1968 | Feinberg |

(Continued)

OTHER PUBLICATIONS

Emerson Process Management, "An introduction to Liquid Pipeline Surge Relief", Apr. 2007. Technical Guide, DAN-LIQ-TG-Surge Relief-0407, Daniel Measurement and Control Inc., Printed in the U.S. (20 Pages).

(Continued)

*Primary Examiner* — Nathaniel Herzfeld
(74) *Attorney, Agent, or Firm* — Mark Malek; Paul Ditmyer; Widerman Malek, PL

(57) ABSTRACT

The T&P relief valve includes a valve casing. A valve assembly is carried by the valve casing and includes a moveable valve shaft and associated valve head sealingly biased against a valve seat by a valve spring which is sealed within a protective chamber configured to contain a first protective fluid. The valve spring is protected, by the protective chamber and first protective fluid, from corrosion, calcification and/or mineral deposits which would affect the valve assembly. A thermal element assembly is carried by an internal tongue of the valve casing. A plunger casing, encasing the upper end of the elongated plunger body and sealing around the captive plunger, is configured to contain a second protective fluid to protect the upper end and captive plunger from corrosion, calcification and/or mineral deposits which could affect the thermal element. An end cap assembly includes a casing seal held against the protective chamber by an end cap that is secured to, and closes, the open top of the valve casing.

20 Claims, 13 Drawing Sheets

(56) References Cited

U.S. PATENT DOCUMENTS

| | | | |
|---|---|---|---|
| 3,662,949 A | | 5/1972 | McIntosh et al. |
| 3,873,808 A | * | 3/1975 | Patton .................... H01H 35/38 |
| | | | 219/491 |
| 4,601,457 A | * | 7/1986 | Austin ................ F16K 31/1225 |
| | | | 251/63 |
| 4,827,962 A | | 5/1989 | Picton |
| 5,071,066 A | | 12/1991 | Willson |
| 5,893,521 A | | 4/1999 | Bertain |
| 6,553,946 B1 | | 4/2003 | Abraham et al. |
| 7,392,766 B2 | | 7/2008 | Jackson |
| 8,490,885 B2 | | 7/2013 | Lamb et al. |
| 9,476,599 B2 | | 10/2016 | Morris et al. |
| 9,854,018 B2 | | 12/2017 | Wang |

OTHER PUBLICATIONS

USPTO, "Non-Final Office Action for related U.S. Appl. No. 15/220,559", dated Apr. 7, 2017 (15 Pages).

Applicant, "Response to Non-Final Office Action for related U.S. Appl. No. 15/220,559", dated Jul. 7, 2017 (8 Pages).

USPTO, "Final Office Action for related U.S. Appl. No. 15/220,559" dated Aug. 9, 2017 (11 Pages).

Applicant, "Response to Final Office Action for related U.S. Appl. No. 15/220,559", dated Nov. 8, 2017 (9 Pages).

USPTO, "Notice of Allowance for related U.S. Appl. No. 15/220,559", dated Dec. 6, 2017 (8 Pages).

* cited by examiner

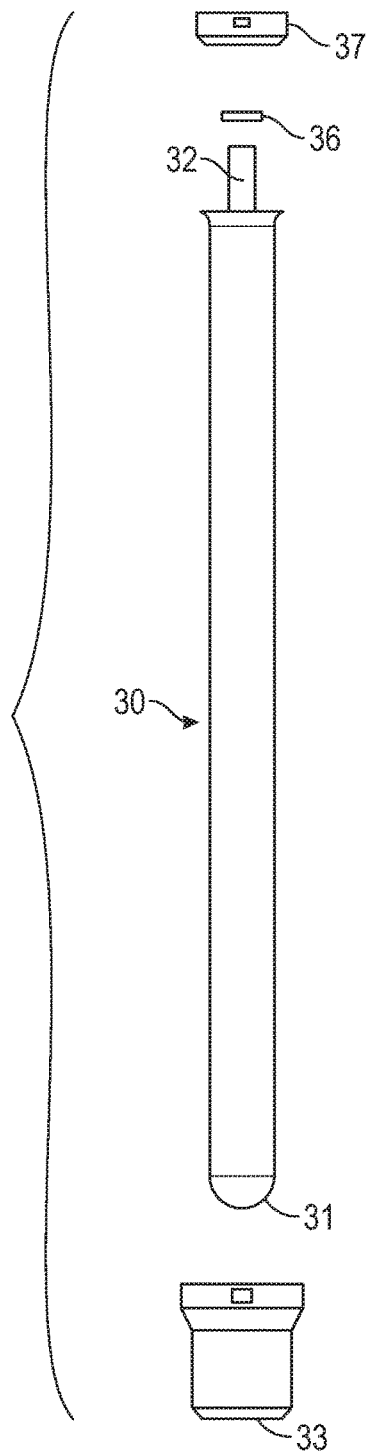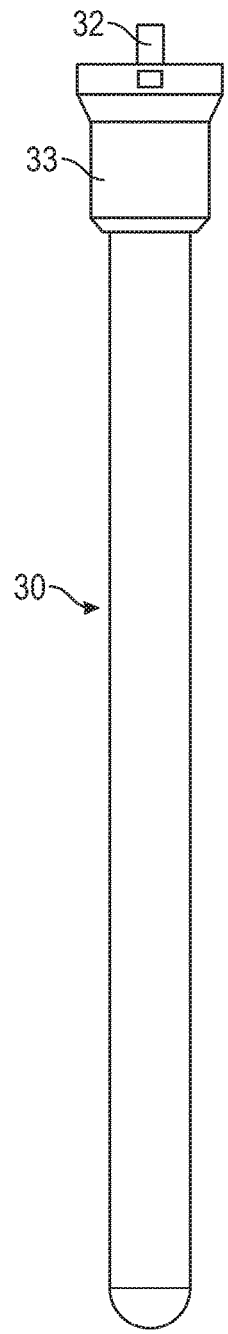
FIG. 3A
FIG. 3B

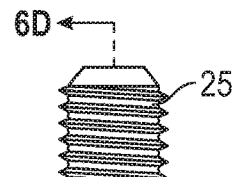
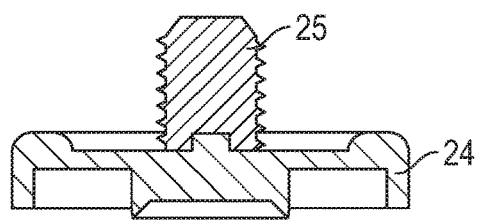
FIG. 6C  FIG. 6D
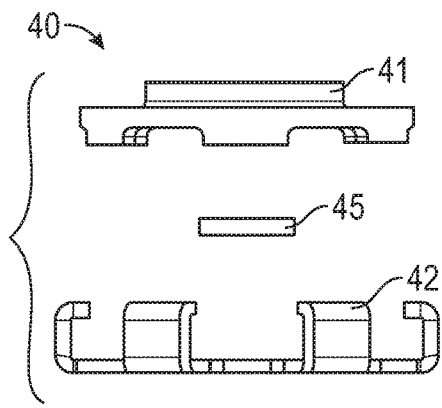
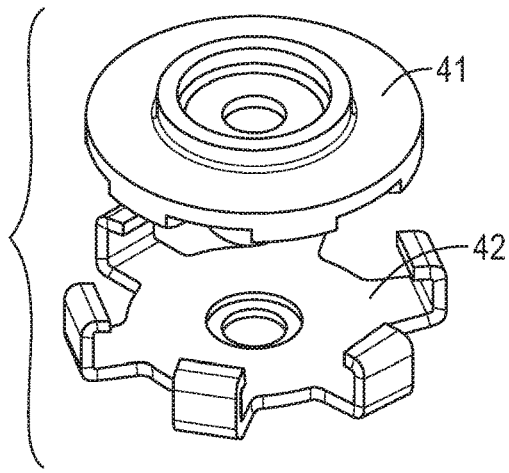
FIG. 7A  FIG. 7B
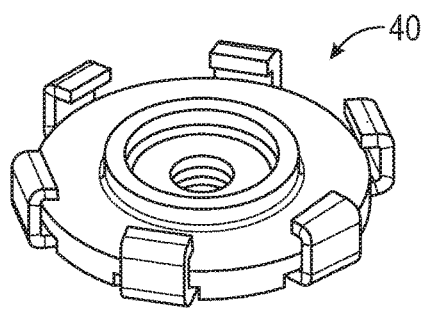
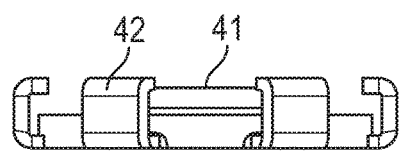
FIG. 7C  FIG. 7D
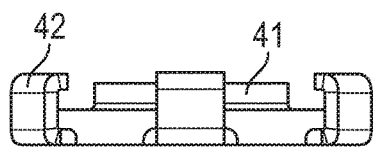
FIG. 7E

SYSTEM, DEVICE AND ASSOCIATED METHODS FOR TEMPERATURE AND PRESSURE RELIEF IN A WATER HEATER

RELATED APPLICATIONS

This application is a continuation-in-part and claims benefit under 35 U.S.C. § 120 of U.S. patent application Ser. No. 15/220,559 titled Temperature and Pressure Relief Valve with Oil-Immersed Mechanism filed Jul. 26, 2016, which, in turn, claims priority from U.S. Provisional Patent Application Ser. No. 62/244,900 filed Oct. 22, 2015, the contents of each of which are incorporated by reference in their entireties except to the extent disclosure therein is inconsistent with disclosure herein.

FIELD OF THE INVENTION

The present invention relates to systems, devices and methods for providing temperature and pressure (T&P) relief in water heaters, and more particularly, to a T&P relief valve with corrosion and calcification prevention.

BACKGROUND OF THE INVENTION

A tank-type liquid heater (e.g., a residential water heater) is conventionally equipped with a relief valve assembly that protects against excessive temperature and excessive pressure. Portions of these relief valves are subject to corrosion and calcification, either of which can render the valve inoperative and unable to prevent a tank from bursting or exploding and sometimes starting a fire. Such fires and explosions cause structural damage, deaths and injuries each year in the United States and worldwide.

Overpressure protection is commonly supplied with a valve in which a coil spring acts on an axially translatable shaft to bias a moveable member (e.g., a valve head or disk) against a seat. The coil spring strength and the disk size are commonly selected so that the valve opens and vents water when pressure in the tank exceeds, for example, 150 psi, which is below a burst pressure of the tank. This valve is subject to corrosion and calcification because one side of the disk is exposed to the water inside the tank during normal operation and both the other side of the disk and the poppet spring are exposed to water when the valve relieves overpressure, is manually opened for test purposes, or is improperly installed to provide upwardly directed outflow.

Attempts to deal with the deleterious effects of corrosion and calcification have commonly resulted in a requirement for regular (generally annual) manual test operation of an overpressure valve and scheduled replacement of that valve. Both of these safety practices are commonly ignored by the consumer, resulting in catastrophic property damages and injuries.

If the heater does not have a functioning inlet check valve, a runaway heater element may cause dangerous excess temperature not accompanied by excess pressure. Overtemperature protection is commonly supplied independently of overpressure protection with a wax motor temperature sensor/actuator that includes a protruding plunger or stroke rod portion that pushes against the wetted side of the poppet valve disk when the wax is heated and expands. The temperature sensor/actuator is also wetted by the water in the tank and is subject to corrosion, calcification and mineral deposits.

Accordingly, there is a need for an improved T&P valve that is protected from catastrophic failure by preventing corrosion, calcification and mineral deposits from affecting operation of the valve during over-temperature and over-pressure events.

SUMMARY OF THE INVENTION

Accordingly, in light of the above, embodiments of the present invention are directed to systems and methods for protecting the operation of a water heater by preventing corrosion, calcification and mineral deposits from affecting operation of the T&P valve during over-temperature and over-pressure events.

Embodiments of the present invention are directed to a temperature and pressure relief valve for use with a water heater tank. The relief valve includes a valve casing including an open top, a valve seat, a threaded inlet port, a threaded outlet port and an internal tongue positioned between the inlet port and the valve seat. A valve assembly is carried by the valve casing and includes a moveable valve shaft and associated valve head sealingly biased against the valve seat by a valve spring which is sealed within a protective chamber configured to contain a first protective fluid. The valve head is configured to be moved off the valve seat against a bias force of the valve spring when a pressure in the water heater tank exceeds a pressure threshold to allow water to flow from the water heater tank via the inlet port and the outlet port, and wherein the valve spring is protected, by the protective chamber and first protective fluid, from corrosion, calcification and/or mineral deposits which would affect the valve assembly. A thermal element assembly is carried by the internal tongue of the valve casing and includes an elongated plunger body having a lower end configured to extend out of the inlet port and into the water held in the water heater tank, and includes a captive plunger extending out of an upper end of the elongated plunger body, opposite the lower end, and configured to push the valve head off the valve seat when a temperature of the water exceeds a temperature threshold. A plunger casing, encasing the upper end of the elongated plunger body and sealing around the captive plunger, is configured to contain a second protective fluid to protect the upper end and captive plunger from corrosion, calcification and/or mineral deposits which could affect the thermal element. An end cap assembly includes a casing seal held against the protective chamber by an end cap that is secured to, and closes, the open top of the valve casing.

Additionally, and/or alternatively, in certain embodiments the end cap assembly also includes a release mechanism configured to manually release the valve head off the valve seat when actuated.

Additionally, and/or alternatively, in certain embodiments the first and second protective fluids comprise protective liquids.

Additionally, and/or alternatively, in certain embodiments the moveable shaft of the valve assembly includes a spring limiter and mounts the moveable valve head and the valve spring.

Additionally, and/or alternatively, in certain embodiments the valve spring comprises a coil spring surrounding the shaft and positioned between the spring limiter and the end cap assembly.

Additionally, and/or alternatively, in certain embodiments the thermal element comprises a wax motor.

Additionally, and/or alternatively, in certain embodiments the valve casing includes a flange surrounding the open top, and the end cap is secured to the flange with the chamber seal therebetween.

Embodiments are also directed to a water heater including a tank configured to hold water and including an outlet, and a temperature and pressure relief valve connected to the outlet of the tank. The relief valve includes a valve casing including an open top, a valve seat, a threaded inlet port, a threaded outlet port and an internal tongue positioned between the inlet port and the valve seat. A valve assembly is carried by the valve casing and includes a moveable valve shaft and associated valve head sealingly biased against the valve seat by a valve spring which is sealed within a protective chamber configured to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, and wherein the valve spring is protected, by the protective chamber and first protective fluid, from corrosion, calcification and/or mineral deposits which would affect the valve assembly. A thermal element assembly is carried by the internal tongue of the valve casing and includes an elongated plunger body having a lower end configured to extend out of the inlet port and into the water held in the water heater tank, and includes a captive plunger extending out of an upper end of the elongated plunger body, opposite the lower end, and configured to push the valve head off the valve seat when a temperature of the water exceeds a temperature threshold. A plunger casing, encasing the upper end of the elongated plunger body and sealing around the captive plunger, is configured to contain a second protective fluid to protect the upper end and captive plunger from corrosion, calcification and/or mineral deposits which could affect the temperature sensor/actuator. An end cap assembly includes a casing seal held against the protective chamber by an end cap that is secured to, and closes, the open top of the valve casing.

Additionally, and/or alternatively, in certain embodiments the end cap assembly also includes a release mechanism configured to manually release the valve head off the valve seat when actuated.

Additionally, and/or alternatively, in certain embodiments the first and second protective fluids comprise protective liquids.

Additionally, and/or alternatively, in certain embodiments the moveable shaft of the valve assembly includes a spring limiter and mounts the moveable valve head and the valve spring.

Additionally, and/or alternatively, in certain embodiments the valve spring comprises a coil spring surrounding the shaft and positioned between the spring limiter and the end cap assembly.

Additionally, and/or alternatively, in certain embodiments the thermal element comprises a wax motor.

Additionally, and/or alternatively, in certain embodiments the valve casing includes a flange surrounding the open top, and wherein the end cap is secured to the flange with the chamber seal therebetween.

Embodiments are also directed to a temperature and pressure relief valve for use with a water heater tank, the relief valve including a valve casing including an open top, a valve seat, a threaded inlet port, a threaded outlet port and a flange surrounding the open top. A valve assembly is carried by the valve casing and includes a moveable valve shaft and associated valve head sealingly biased against the valve seat by a valve spring which is sealed within a protective chamber configured to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, wherein the valve spring is protected, by the protective chamber and first protective fluid, from corrosion, calcification and/or mineral deposits which would affect the valve assembly, and wherein the moveable shaft of the valve assembly includes a spring limiter and mounts the moveable valve head and the valve spring. An end cap assembly includes a casing seal held against the protective chamber by an end cap that is secured to the flange, and closes, the open top of the valve casing. The end cap assembly also includes a release mechanism configured to manually release the valve head off the valve seat when actuated.

Additionally, and/or alternatively, in certain embodiments the first and second protective fluids comprise protective liquids.

Additionally, and/or alternatively, in certain embodiments the valve spring comprises a coil spring surrounding the shaft and positioned between the spring limiter and the end cap assembly.

Embodiments are also directed to a method of making a temperature and pressure relief valve for use with a water heater tank. The method includes: providing a valve casing including an open top, a valve seat, a threaded inlet port, a threaded outlet port and an internal tongue positioned adjacent the inlet port and the valve seat; inserting a thermal element assembly into the valve casing to be carried by the internal tongue; inserting a valve assembly into the valve casing, the valve assembly including a moveable valve shaft and associated valve head sealingly biased against the valve seat by a valve spring which is sealed within a protective chamber to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, and wherein the valve spring is protected, by the protective chamber and first protective fluid, from corrosion, calcification and/or mineral deposits which would affect the valve assembly. The thermal element assembly is carried by the internal tongue of the valve casing includes an elongated plunger body having a lower end configured to extend out of the inlet port and into the water held in the water heater tank, and includes a captive plunger extending out of an upper end of the elongated plunger body, opposite the lower end, and configured to push the valve head off the valve seat when a temperature of the water exceeds a temperature threshold. A plunger casing, encases the upper end of the elongated plunger body and seals around the captive plunger, and contains a second protective fluid to protect the upper end and captive plunger from corrosion, calcification and/or mineral deposits which could affect the thermal element. The method further includes: securing an end cap assembly, comprising an end cap holding a chamber seal against the protective chamber, to the valve casing to close the open top of the valve casing; and attaching a release mechanism to the valve shaft extending out of the end cap assembly, the release mechanism being configured to manually release the valve head off the valve seat when actuated.

Additionally, and/or alternatively, in certain embodiments the first and second protective fluids comprise protective liquids.

Additionally, and/or alternatively, in certain embodiments the moveable shaft of the valve assembly includes a spring limiter and mounts the moveable valve head and the valve spring, and wherein the valve spring comprises a coil spring surrounding the shaft and positioned between the spring limiter and the end cap assembly.

Additionally, and/or alternatively, in certain embodiments the thermal element comprises a wax motor.

Additionally, and/or alternatively, in certain embodiments the valve casing includes a flange surrounding the open top; and wherein the end cap is secured to the flange with the chamber seal therebetween.

BRIEF DESCRIPTION OF THE DRAWINGS

FIG. 3A is an exploded view of the thermal element of the T&P valve of FIG. 1 according to an embodiment of the invention.

FIG. 3B is a side view of the thermal element of FIG. 3A.

FIG. 6C is a side view of the valve head assembly of FIG. 6A.

FIG. 6D is a cross-sectional view of the valve head assembly of FIG. 6C taken along the axis BG-BG.

FIG. 7A is an exploded view illustrating components of the end cap assembly of the T&P valve of FIG. 1 according to an embodiment of the invention.

FIG. 7B is a perspective view of the end cap assembly of FIG. 7A.

FIG. 7C is a perspective view of the assembled end cap assembly of FIG. 7B.

FIG. 7D is a side view of the assembled end cap assembly of FIG. 7A.

FIG. 7E is another side view of the assembled end cap assembly of FIG. 7A.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

As discussed above, there is a need for an improved temperature and pressure (T&P) relief valve that is protected from catastrophic failure by preventing corrosion, calcification and mineral deposits from affecting operation of the valve during over-temperature and over-pressure events. Failure of the T&P valve in a residential or commercial water heater can lead to fires and explosions which may cause structural damage, injuries and deaths. As is known to those skilled in the art, the T&P valve is connected to an outlet of the water heater.

Figure 1A:
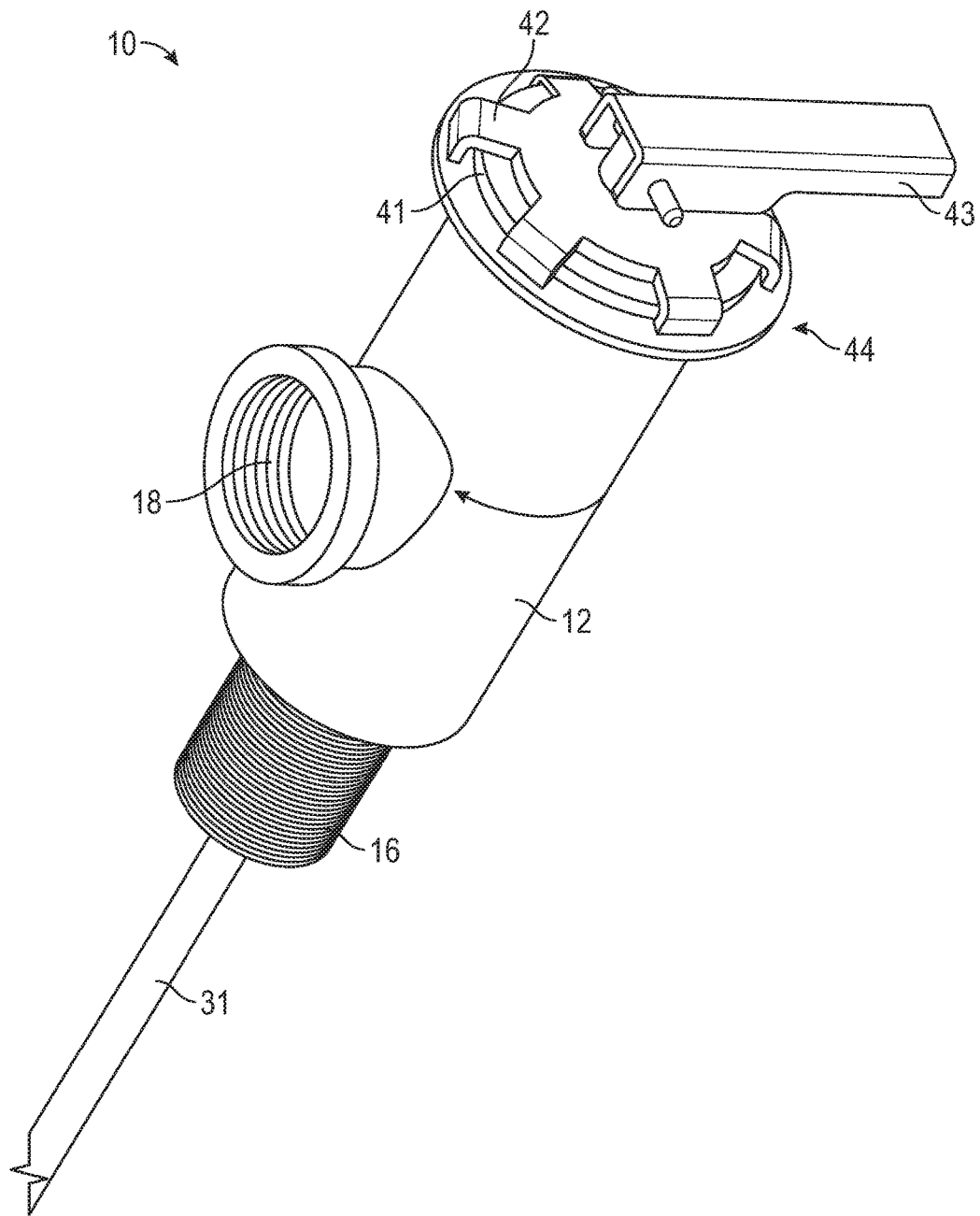
FIG. 1A is a perspective view of a T&P valve according to an embodiment of the invention.
Figure 1B:
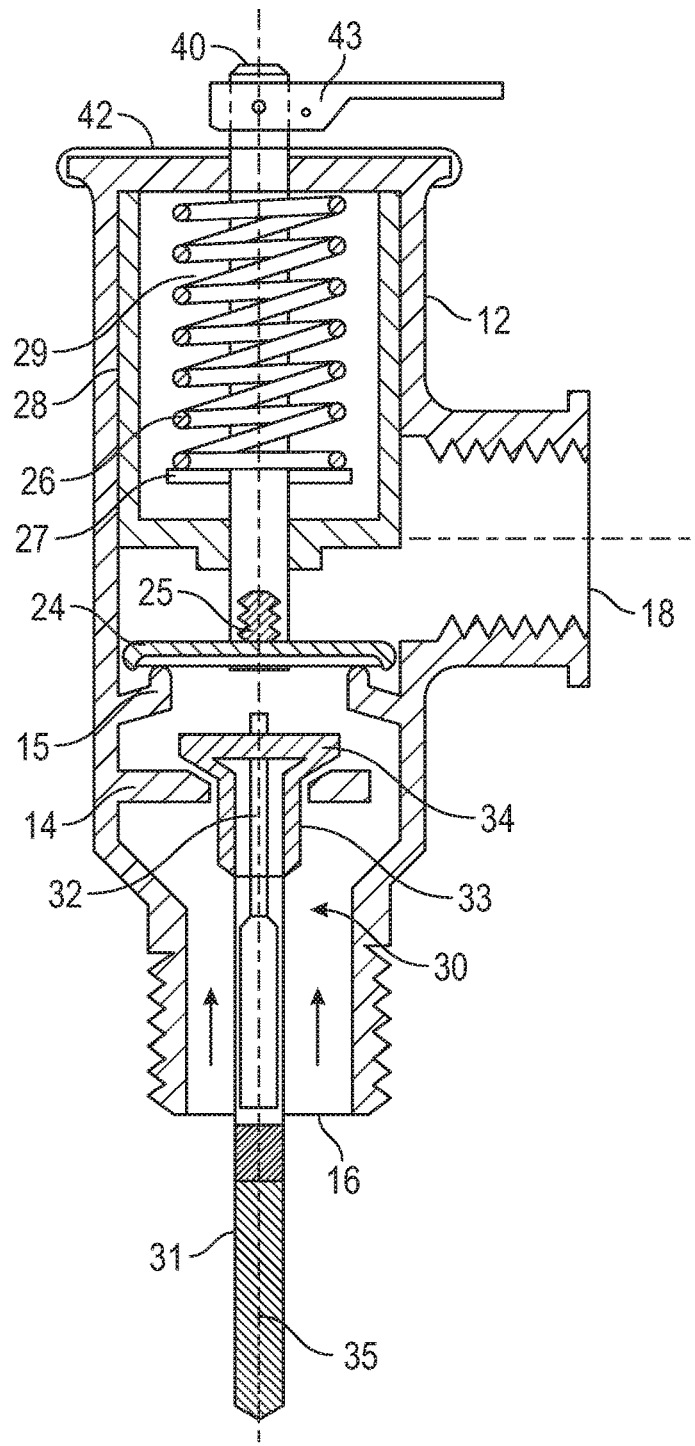
FIG. 1B is a cross-sectional view of the T&P valve of FIG. 1A.
Figure 2:
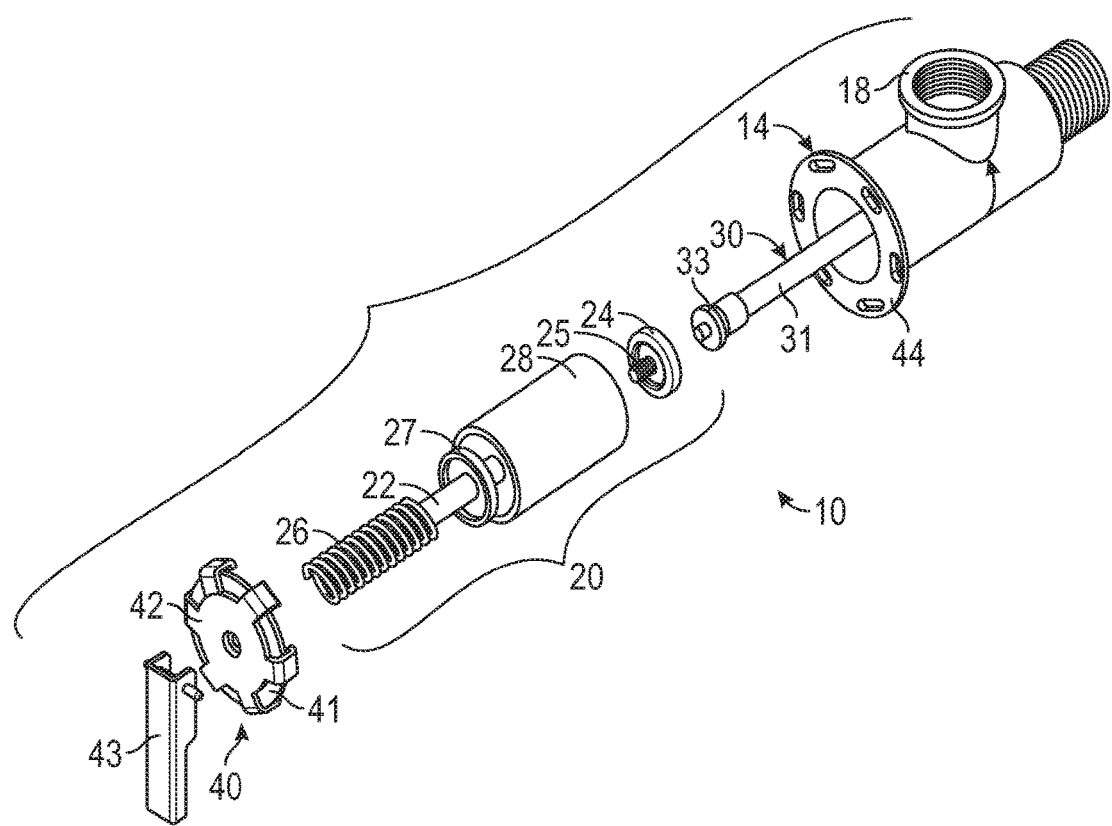
FIG. 2 is an exploded view of the T&P valve assembly of FIG. 1.

Referring now to FIGS. 1 and 2, a T&P valve in accordance with feature of an embodiment of the present invention will be described. FIG. 1 is a perspective view of a T&P valve according to an embodiment of the invention. FIG. 2 is an exploded view of the T&P valve assembly of FIG. 1.

The T&P valve 10 includes a valve casing 12 including an open top 14, an internal valve seat 15, a threaded inlet port 16, a threaded outlet port 18 and an internal tongue 19 positioned between the inlet port 16 and the internal valve seat 15. A valve assembly 20 is carried by the valve casing 12 and includes a moveable valve shaft 22 and associated valve head 24 sealingly biased against the valve seat by a valve spring 26 which is sealed within a protective chamber 28 configured to contain a first protective fluid 29 (e.g. air or a protective liquid such as a lubricant). The valve head 24 may include a threaded stem 25 for attachment to the valve shaft 22. The moveable valve shaft 22 may include a spring limiter 27 and mount the moveable valve head 24 and the valve spring 26 thereon. The valve spring may preferably be a coil spring surrounding the shaft 22 and positioned between the spring limiter 27 and the open top 14.

The valve head 24 is configured to be moved off the valve seat against a bias force of the valve spring 26 when a pressure in the water heater tank exceeds a pressure threshold to allow water to flow from the water heater tank via the inlet port 16 and the outlet port 18, and wherein the valve spring 26 is protected, by the protective chamber 28 and first protective fluid 29, from corrosion, calcification and/or mineral deposits which would affect the valve assembly 20.

A thermal element assembly 30 is carried by the internal tongue 19 of the valve casing 12 and includes an elongated plunger body 31 having a lower end configured to extend out of the inlet port 16 and into the water held in the water heater tank, and includes a captive plunger 32 extending out of an upper end of the elongated plunger body 31, opposite the lower end, and configured to push the valve head 24 off the valve seat 15 when a temperature of the water exceeds a temperature threshold. A plunger casing 33, encasing the upper end of the elongated plunger body 31 and sealing around the captive plunger 32, is configured to contain a second protective fluid 34 to protect the upper end and captive plunger 32 from corrosion, calcification and/or mineral deposits which could affect reliable operation of the thermal element 30. The second protective fluid 34 may be air or a protective lubricant. The thermal element 30 may typically be a wax motor which includes an expandable amount of wax 35 within the plunger body 31.

An end cap assembly 40 includes a casing seal 41 held against the protective chamber 28 by an end cap 42 that is secured to, and closes, the open top 14 of the valve casing 12. The end cap assembly 40 also includes a release mechanism 43 configured to manually release the valve head 24 off the valve seat 15 when actuated. The valve casing 12 may include a flange 44 surrounding the open top 14, and the end cap 42 is secured to the flange 44 with the casing seal 41 therebetween.

Figure 3C:
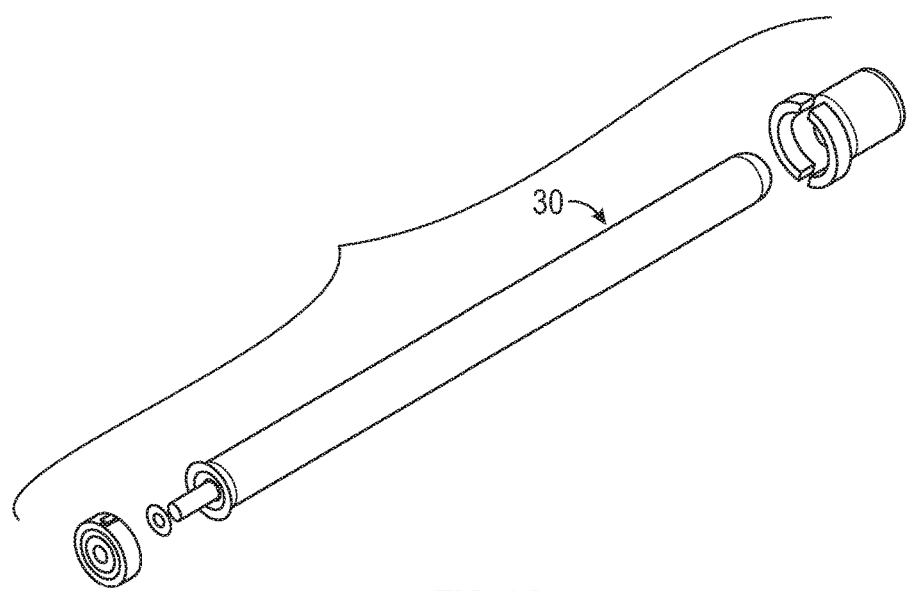
FIG. 3C is a perspective view of the thermal element of FIG. 3A.
Figure 3D:
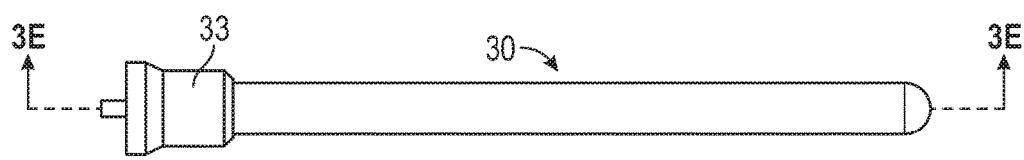
FIG. 3D is a side view of the assembled thermal element of FIG. 3A.
Figure 3E:
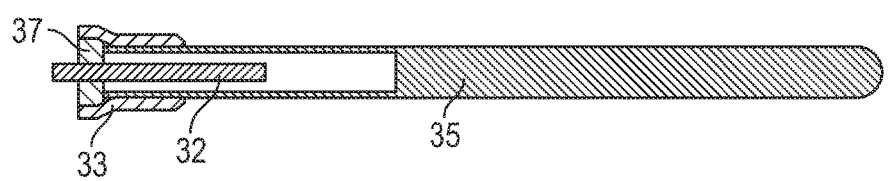
FIG. 3E is a cross-sectional view of the assembled thermal element of FIG. 3D taken along the axis A-A.
Figure 4:
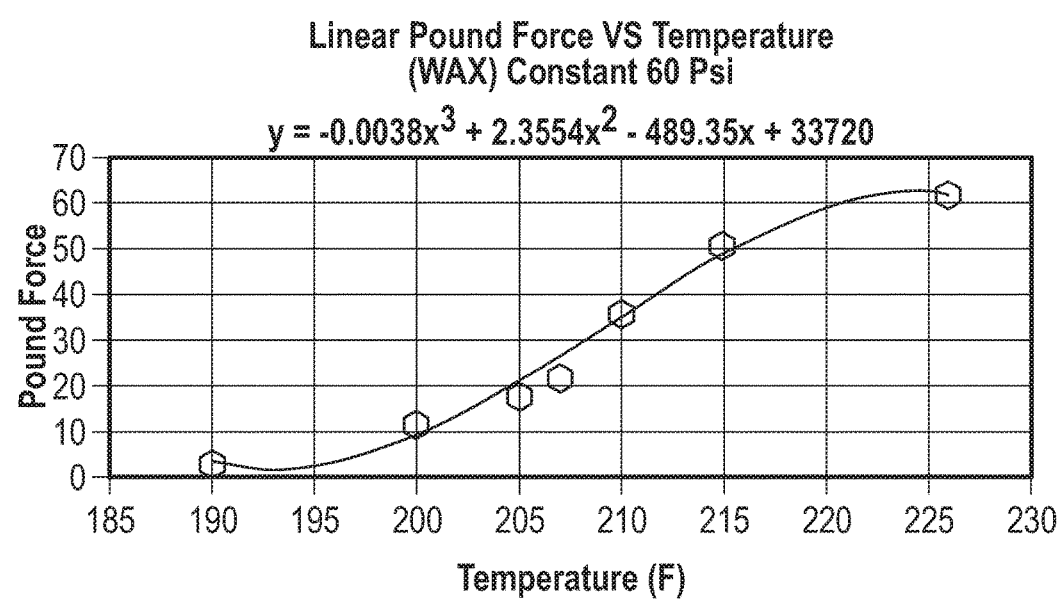
FIG. 4 is a graph illustrating linear pound force vs temperature for the thermal element of FIG. 3A.

FIG. 3A is an exploded view of the thermal element of the T&P valve 10 of FIG. 1 according to an embodiment of the invention. An O-ring 36 and stopper 37 are also illustrated. FIG. 3B is a side view of the thermal element of FIG. 3A. FIG. 3C is a perspective view of the thermal element of FIG. 3A. FIG. 3D is a side view of the assembled thermal element of FIG. 3A. FIG. 3E is a cross-sectional view of the assembled thermal element of FIG. 3D taken along the axis A-A. FIG. 4 is a graph illustrating linear pound force vs temperature for the thermal element of FIG. 3A.

Figure 5A:
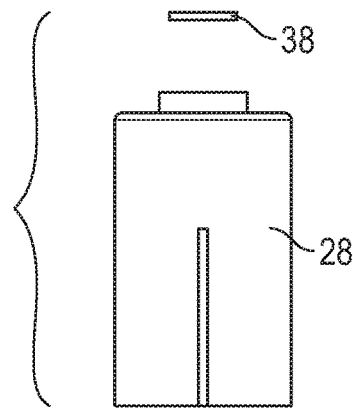
FIG. 5A is an exploded view of the protective chamber of the T&P valve of FIG. 1 according to an embodiment of the invention.
Figure 5B:
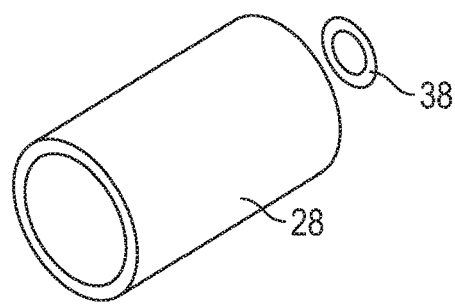
FIG. 5B is a perspective view of the protective chamber of FIG. 5A.
Figure 5C:
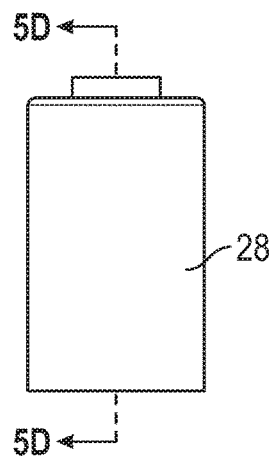
FIG. 5C is a side view of the assembled protective chamber of FIG. 5A.
Figure 5D:
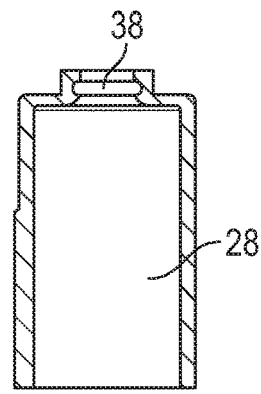
FIG. 5D is a cross-sectional view of the protective chamber of FIG. 5C taken along the axis A-A.

FIG. 5A is an exploded view of the protective chamber 28 of the T&P valve 10 of FIG. 1 according to an embodiment of the invention. An O-ring 38 is also shown. FIG. 5B is a perspective view of the protective chamber 28 of FIG. 5A. FIG. 5C is a side view of the assembled protective chamber 28 of FIG. 5A. FIG. 5D is a cross-sectional view of the protective chamber 28 of FIG. 5C taken along the axis A-A.

Figure 6A:
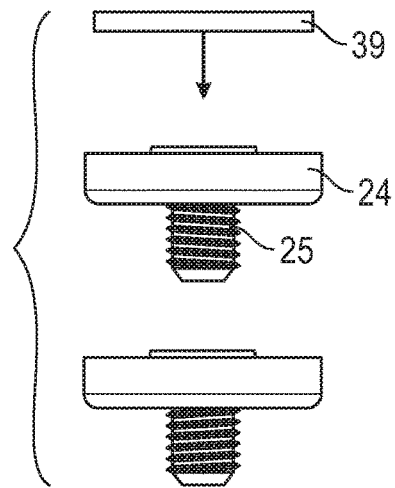
FIG. 6A is a side view illustrating the assembly of the components of the valve head of the T&P valve of FIG. 1 according to an embodiment of the invention.
Figure 6B:
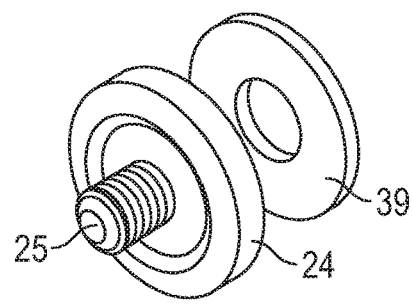
FIG. 6B is a perspective view of the valve head assembly of FIG. 6A.

FIG. 6A is a side view illustrating the assembly of the components of the valve head 24 of the T&P valve 10 of FIG. 1 according to an embodiment of the invention. The threaded stem 25 and a washer 39 are also shown. The washer 39 is seated in a groove of the valve head 24 and held via friction, adhesive or crimping of the edges of the valve head 24, for example. FIG. 6B is a perspective view of the valve head 24 assembly of FIG. 6A. FIG. 6C is a side view of the valve head 24 assembly of FIG. 6A. FIG. 6D is a cross-sectional view of the valve head 24 assembly of FIG. 6C taken along the axis BG-BG.

FIG. 7A is an exploded view illustrating components of the end cap assembly 40 of the T&P valve 10 of FIG. 1 according to an embodiment of the invention. As discussed above, the end cap assembly 40 includes a casing seal 41 and an end cap 42. An O-ring 45 may also be included as illustrated. FIG. 7B is a perspective view of the end cap assembly 40 of FIG. 7A. FIG. 7C is a perspective view of the assembled end cap assembly 40 of FIG. 7B. FIG. 7D is a side view of the assembled end cap assembly 40 of FIG. 7A. FIG. 7E is another side view of the assembled end cap assembly 40 of FIG. 7A.

Figure 8A:
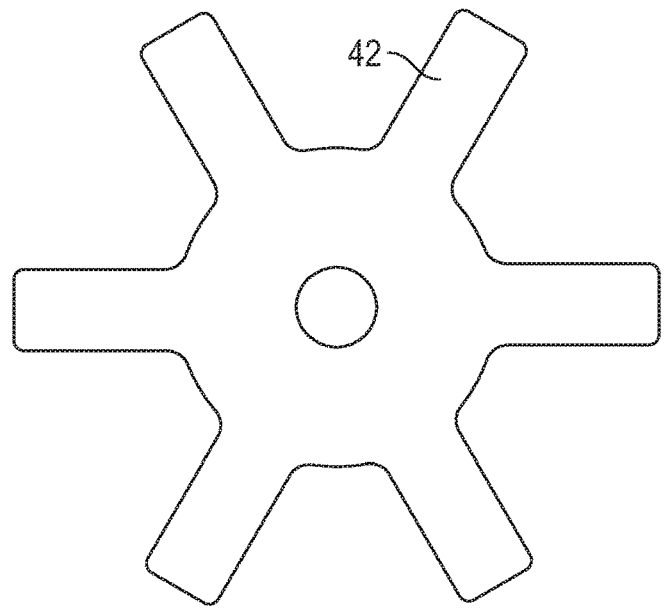
FIG. 8A is a top view of the end cap of the end cap assembly of FIG. 7A prior to forming the walls.
Figure 8B:
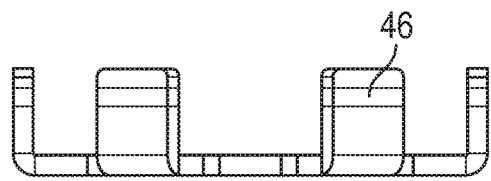
FIG. 8B is a side view of the end cap of the end cap assembly of FIG. 8A after initial wall formation.
Figure 8C:
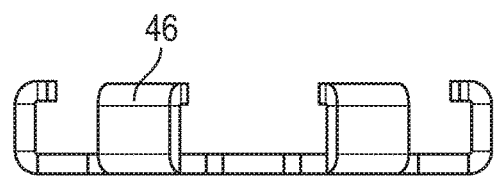
FIG. 8C is a side view of the end cap of the end cap assembly of FIG. 8A after final formation of the walls.

FIG. 8A is a top view of the end cap 42 of the end cap assembly 40 of FIG. 7A prior to forming the walls 46. FIG. 8B is a side view of the end cap 42 after initial wall formation. FIG. 8C is a side view of the end cap 42 after final formation of the walls 46.

Figure 9A:
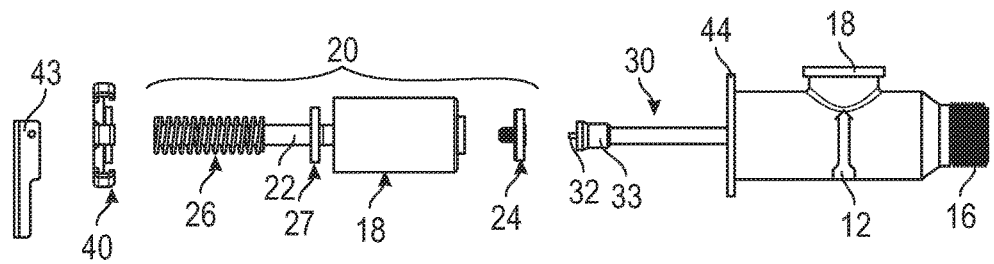
FIG. 9A is an exploded view illustrating the method of making a T&P valve of FIG. 1 according to an embodiment of the invention.
Figure 9B:
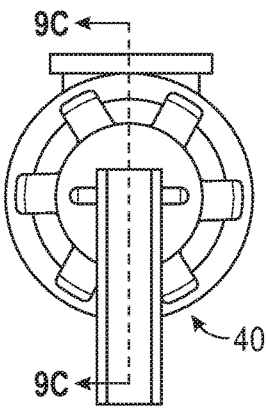
FIG. 9B is a top view of the assembled T&P valve of FIG. 9A.
Figure 9C:
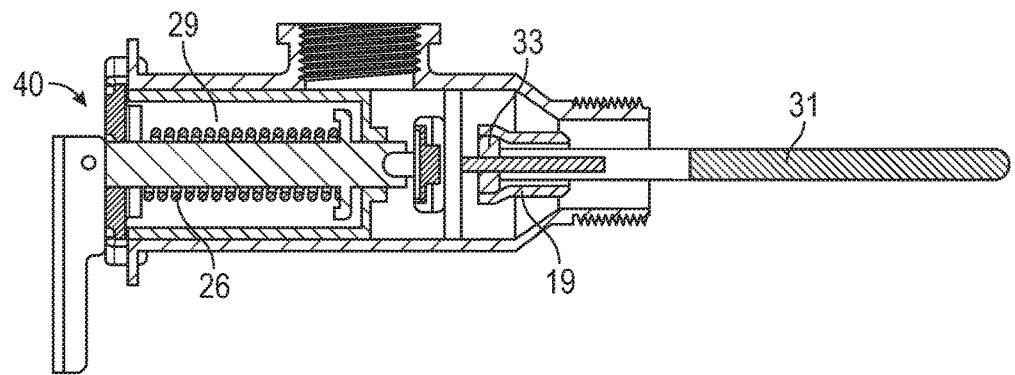
FIG. 9C is a cross-sectional view of the assembled T&P valve of FIG. 9A.
Figure 9D:
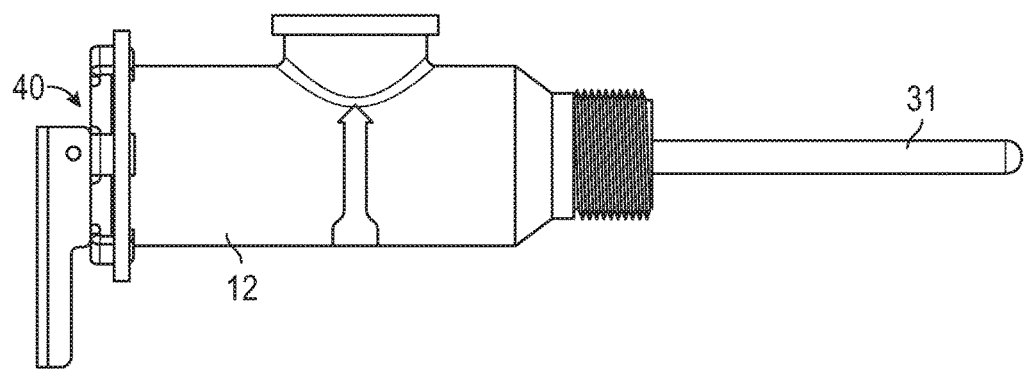
FIG. 9D is a side view of the assembled T&P valve of FIG. 9A.

FIG. 9A is an exploded view illustrating the method of making a T&P valve 10 of FIG. 1 according to an embodiment of the invention. FIG. 9B is a top view of the assembled T&P valve 10 of FIG. 9A. FIG. 9C is a cross-sectional view of the assembled T&P valve 10 of FIG. 9A. FIG. 9D is a side view of the assembled T&P valve 10 of FIG. 9A.

A method aspect of the invention is directed to making a T&P relief valve 10 for use with a water heater tank. The method includes providing the valve casing 12 including the open top 14, valve seat 15, threaded inlet port 16, threaded outlet port 18 and internal tongue 19 positioned adjacent the inlet port 16 and the valve seat 15. The method further includes: inserting the thermal element assembly 30 into the valve casing 12 to be carried by the internal tongue 19; and inserting a valve assembly 20 into the valve casing 12, the valve assembly including moveable valve shaft 22 and associated valve head 24 sealingly biased against the valve seat 15 by a valve spring 26 which is sealed within a protective chamber 28 to contain a first protective fluid 29.

The valve head 24 is configured to be moved off the valve seat 15 against a bias force of the valve spring 26 when a pressure in the water heater tank exceeds a pressure threshold to allow water to flow from the water heater tank via the inlet port 16 and the outlet port 18. The valve spring 26 is protected, by the protective chamber 28 and first protective fluid 29, from corrosion, calcification and/or mineral deposits which would affect the valve assembly 20. The thermal element assembly 30 is carried by the internal tongue 19 of the valve casing 12 and includes an elongated plunger body 31 having a lower end configured to extend out of the inlet port 16 and into the water held in the water heater tank, and includes a captive plunger 32 extending out of an upper end of the elongated plunger body, opposite the lower end, and configured to push the valve head 24 off the valve seat 15 when a temperature of the water exceeds a temperature threshold. A plunger casing 33, encases the upper end of the elongated plunger body 31 and seals around the captive plunger 32, and contains a second protective fluid to protect the upper end and captive plunger 32 from corrosion, calcification and/or mineral deposits which could affect the thermal element assembly 30.

The method further includes: securing an end cap assembly 40, comprising an end cap 42 holding a casing seal 41 against the protective chamber 28, to the valve casing 12 to close the open top 14 of the valve casing 12; and attaching a release mechanism 43 to the valve shaft 22 extending out of the end cap assembly 40. The release mechanism is configured to manually release the valve head 24 off the valve seat 15 when actuated.

Figure 10:
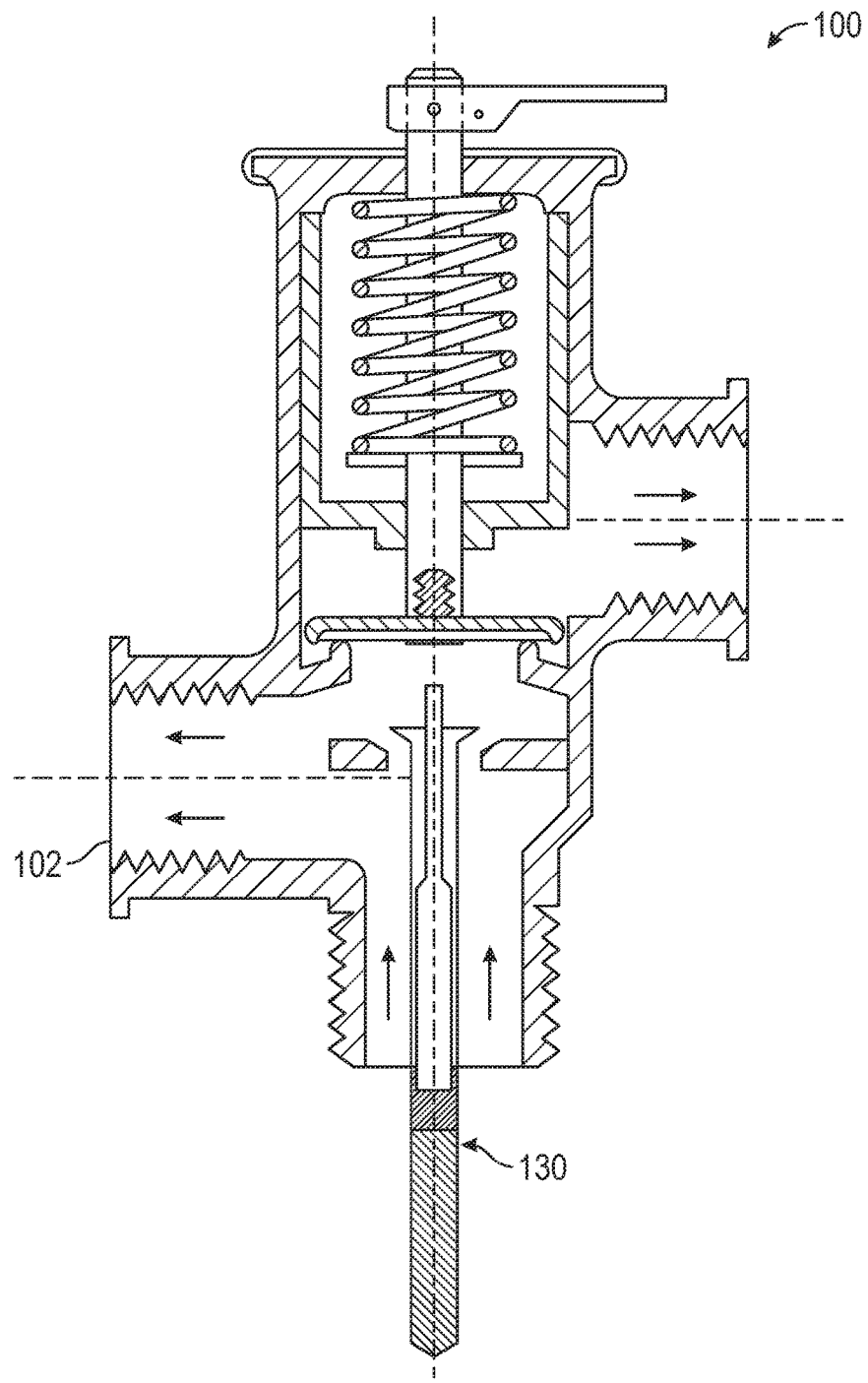
FIG. 10 is a cross-sectional view of a T&P valve having a second outlet and thermal element according to another embodiment of the invention.

FIG. 10 is a cross-sectional view of a T&P valve 100 according to another embodiment of the invention. The T&P valve 100 includes many components and features in common with the T&P valve 10 of FIG. 1. However, this embodiment of the T&P valve includes another outlet 102 in the casing 112. This outlet 102 is configured to be used as the water source outlet from the water tank to the internal plumbing of the residence or commercial property. As such, in view of the increased flow of water around the thermal element assembly 130, the need for a protective casing 33 (as in FIG. 1) may be eliminated. In other words, since water is continuously or a least periodically flowing around the upper end of the thermal element assembly 30, there is much lower likelihood of corrosion, calcification and/or mineral deposits which could affect the thermal element assembly 130.

Figure 11:
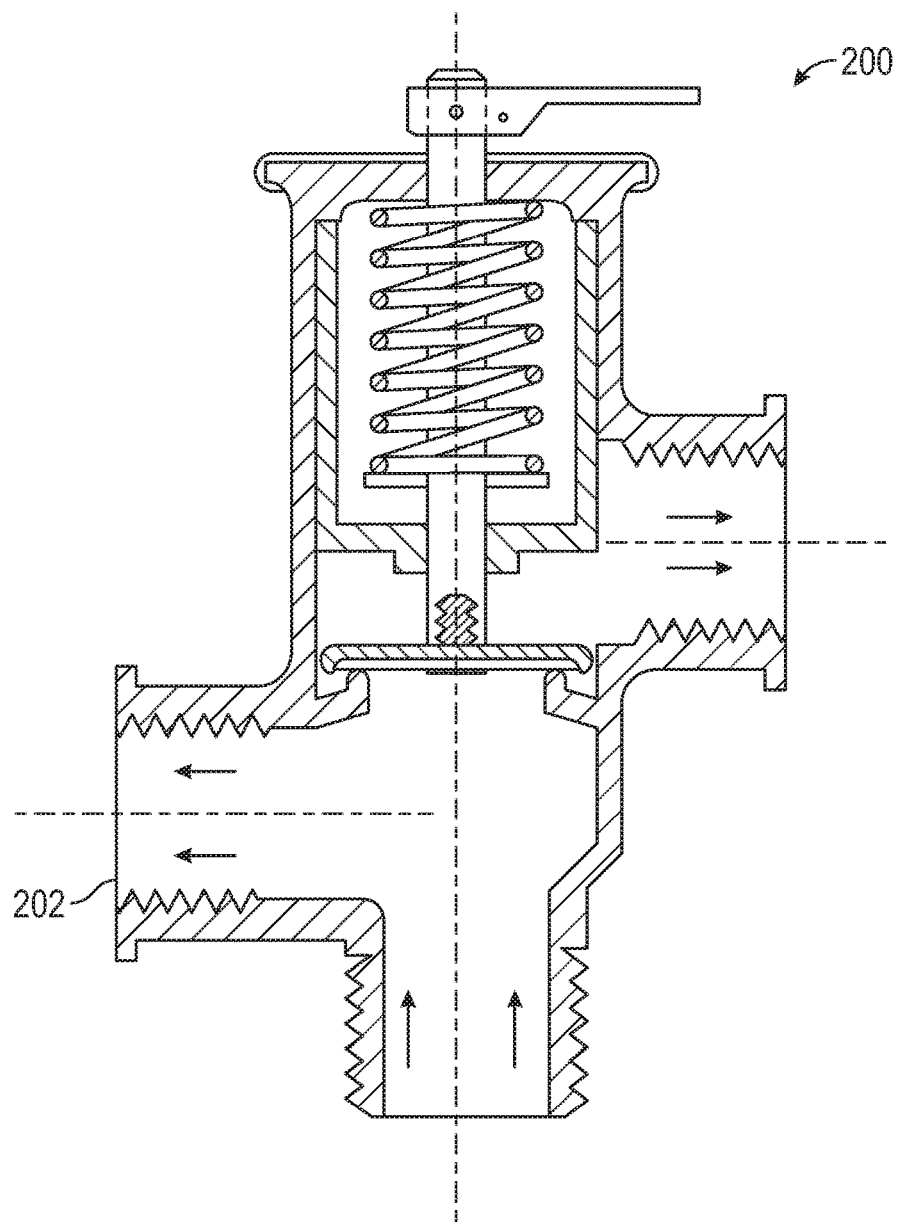
FIG. 11 is a cross-sectional view of a T&P valve having a second outlet but no thermal element according to another embodiment of the invention.

FIG. 11 is a cross-sectional view of a T&P valve 200 having a second outlet 202 but no thermal element according to another embodiment of the invention. Here, the thermal element (and internal mounting tongue) may be eliminated altogether in view of the connection of the second outlet 202 to the internal plumbing of the residence or commercial building. For example, the expansion of water in the tank in view of increased temperature may be buffered by the volume of the internal plumbing.

Thus, as described, the embodiments of the present invention are directed to devices, systems and methods for protecting the operation of a water heater by preventing corrosion, calcification and mineral deposits from affecting operation of the T&P valve during over-temperature and over-pressure events.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A temperature and pressure relief valve for use with a water heater tank, the relief valve comprising:
   a valve casing including an open top, a valve seat, a threaded inlet port, a threaded outlet port and an internal tongue positioned between the inlet port and the valve seat;
   a valve assembly, carried by the valve casing, and including a moveable valve shaft and associated valve head sealingly biased against the valve seat by a valve spring which is sealed within a protective chamber configured to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, and wherein the valve spring is protected, by the protective chamber and first protective fluid, from corrosion, calcification and/or mineral deposits which would affect the valve assembly;
   a thermal element assembly carried by the internal tongue of the valve casing and including an elongated plunger body having a lower end configured to extend out of the inlet port and into the water held in the water heater tank, and including a captive plunger extending out of an upper end of the elongated plunger body, opposite the lower end, and configured to push the valve head off the valve seat when a temperature of the water exceeds a temperature threshold;
   a plunger casing, encasing the upper end of the elongated plunger body and sealing around the captive plunger, and configured to contain a second protective fluid to protect the upper end and captive plunger from corrosion, calcification and/or mineral deposits which could affect the thermal element; and
   an end cap assembly comprising a casing seal held against the protective chamber by an end cap that is secured to, and closes, the open top of the valve casing;
   wherein the end cap assembly also includes a release mechanism configured to manually release the valve head off the valve seat when actuated.

2. The temperature and pressure relief valve according to claim 1 wherein the first and second protective fluids comprise protective liquids.

3. The temperature and pressure relief valve according to claim 1 wherein the moveable shaft of the valve assembly includes a spring limiter and mounts the moveable valve head and the valve spring.

4. The temperature and pressure relief valve according to claim 3 wherein the valve spring comprises a coil spring surrounding the shaft and positioned between the spring limiter and the end cap assembly.

5. The temperature and pressure relief valve according to claim 1 wherein the thermal element comprises a wax motor.

6. The temperature and pressure relief valve according to claim 1 wherein the valve casing includes a flange surrounding the open top; and wherein the end cap is secured to the flange with the chamber seal therebetween.

7. A water heater comprising:
- a tank configured to hold water and including an outlet; and
- a temperature and pressure relief valve connected to the outlet of the tank, the relief valve comprising:
  - a valve casing including an open top, a valve seat, a threaded inlet port, a threaded outlet port and an internal tongue positioned between the inlet port and the valve seat,
  - a valve assembly, carried by the valve casing, and including a moveable valve shaft and associated valve head sealingly biased against the valve seat by a valve spring which is sealed within a protective chamber configured to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, and wherein the valve spring is protected, by the protective chamber and first protective fluid, from corrosion, calcification and/or mineral deposits which would affect the valve assembly,
  - a thermal element assembly carried by the internal tongue of the valve casing and including an elongated plunger body having a lower end configured to extend out of the inlet port and into the water held in the water heater tank, and including a captive plunger extending out of an upper end of the elongated plunger body, opposite the lower end, and configured to push the valve head off the valve seat when a temperature of the water exceeds a temperature threshold,
  - a plunger casing, encasing the upper end of the elongated plunger body and sealing around the captive plunger, and configured to contain a second protective fluid to protect the upper end and captive plunger from corrosion, calcification and/or mineral deposits which could affect the temperature sensor/actuator, and
  - an end cap assembly comprising a casing seal held against the protective chamber by an end cap that is secured to, and closes, the open top of the valve casing,
  - wherein the end cap assembly also includes a release mechanism configured to manually release the valve head off the valve seat when actuated.

8. The water heater according to claim 7 wherein the first and second protective fluids comprise protective liquids.

9. The water heater according to claim 7 wherein the moveable shaft of the valve assembly includes a spring limiter and mounts the moveable valve head and the valve spring.

10. The water heater according to claim 9 wherein the valve spring comprises a coil spring surrounding the shaft and positioned between the spring limiter and the end cap assembly.

11. The water heater according to claim 7 wherein the thermal element comprises a wax motor.

12. The water heater according to claim 7 wherein the valve casing includes a flange surrounding the open top; and wherein the end cap is secured to the flange with the chamber seal therebetween.

13. A temperature and pressure relief valve for use with a water heater tank, the relief valve comprising:
- a valve casing including an open top, a valve seat, a threaded inlet port, a threaded outlet port and a flange surrounding the open top;
- a valve assembly, carried by the valve casing, and including a moveable valve shaft and associated valve head sealingly biased against the valve seat by a valve spring which is sealed within a protective chamber that includes a cylindrical housing, with an open upper end and a closed lower end, inserted into and abutting the valve casing, the cylindrical housing being configured to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, wherein the valve spring is protected, by the protective chamber and first protective fluid, from corrosion, calcification and/or mineral deposits which would affect the valve assembly, and wherein the moveable shaft of the valve assembly includes a spring limiter and mounts the moveable valve head and the valve spring; and
- an end cap assembly that closes both the upper end of the cylindrical housing of the protective chamber and the open top of the valve casing, the end cap assembly comprising a casing seal that is held against the open upper end of the cylindrical housing of the protective chamber by an end cap that is secured to the flange of the valve casing;
- wherein the end cap assembly also includes a release mechanism configured to manually release the valve head off the valve seat when actuated.

14. The temperature and pressure relief valve according to claim 13 wherein the first protective fluid comprises a protective liquid.

15. The temperature and pressure relief valve according to claim 13 wherein the valve spring comprises a coil spring surrounding the shaft and positioned between the spring limiter and the end cap assembly.

16. A method of making a temperature and pressure relief valve for use with a water heater tank, the method comprising:
- providing a valve casing including an open top, a valve seat, a threaded inlet port, a threaded outlet port and an internal tongue positioned adjacent the inlet port and the valve seat;
- inserting a thermal element assembly into the valve casing to be carried by the internal tongue;
- inserting a valve assembly into the valve casing, the valve assembly including a moveable valve shaft and associated valve head sealingly biased against the valve seat by a valve spring which is sealed within a protective chamber to contain a first protective fluid, wherein the valve head is configured to be moved off the valve seat against a bias force of the valve spring when a pressure in the water heater tank exceeds a pressure threshold to allow water to flow from the water heater tank via the inlet port and the outlet port, and wherein the valve spring is protected, by the protective chamber and first protective fluid, from corrosion, calcification and/or mineral deposits which would affect the valve assembly;
- wherein the thermal element assembly carried by the internal tongue of the valve casing includes an elongated plunger body having a lower end configured to extend out of the inlet port and into the water held in the water heater tank, and includes a captive plunger extending out of an upper end of the elongated plunger body, opposite the lower end, and configured to push the valve head off the valve seat when a temperature of the water exceeds a temperature threshold;

wherein a plunger casing, encases the upper end of the elongated plunger body and seals around the captive plunger, and contains a second protective fluid to protect the upper end and captive plunger from corrosion, calcification and/or mineral deposits which could affect the thermal element;

securing an end cap assembly, comprising an end cap holding a chamber seal against the protective chamber, to the valve casing to close the open top of the valve casing; and attaching a release mechanism to the valve shaft extending out of the end cap assembly, the release mechanism being configured to manually release the valve head off the valve seat when actuated.

17. The method according to claim 16 wherein the first and second protective fluids comprise protective liquids.

18. The method according to claim 16 wherein the moveable shaft of the valve assembly includes a spring limiter and mounts the moveable valve head and the valve spring; and wherein the valve spring comprises a coil spring surrounding the shaft and positioned between the spring limiter and the end cap assembly.

19. The method according to claim 16 wherein the thermal element comprises a wax motor.

20. The method according to claim 16 wherein the valve casing includes a flange surrounding the open top; and wherein the end cap is secured to the flange with the chamber seal therebetween.

* * * * *